US012256469B2

(12) United States Patent
Thorens

(10) Patent No.: US 12,256,469 B2
(45) **Date of Patent: *Mar. 18, 2025**

(54) HEAT DIFFUSER FOR AN AEROSOL-GENERATING SYSTEM

(71) Applicant: Altria Client Services LLC, Richmond, VA (US)

(72) Inventor: Michel Thorens, Moudon (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,255

(22) Filed: Jan. 14, 2021

(65) Prior Publication Data

US 2021/0127745 A1 May 6, 2021

Related U.S. Application Data

(63) Continuation of application No. 15/624,826, filed as application No. PCT/EP2017/063056 on May 30, 2017, now Pat. No. 10,918,135.

(30) Foreign Application Priority Data

May 31, 2016 (EP) .................................... 16172294

(51) Int. Cl.

*H05B 1/02* (2006.01)
*A24D 1/20* (2020.01)

(Continued)

(52) U.S. Cl.

CPC ............. *H05B 1/0227* (2013.01); *A24D 1/20* (2020.01); *A24F 40/44* (2020.01); *A24F 40/46* (2020.01);

(Continued)

(58) Field of Classification Search

CPC .......... A24F 40/46; A24F 40/44; A24F 40/10; H05B 3/42; H05B 1/0227; H05B 2203/021

See application file for complete search history.

(56) References Cited

U.S. PATENT DOCUMENTS 1,535,005 A * 4/1925 Wilson ..................... A24F 1/00 131/207
3,390,686 A * 7/1968 Irby, Jr. ................. A24D 3/061 131/337

(Continued)

FOREIGN PATENT DOCUMENTS

BE 823712 A 4/1975
CN 1126426 A 7/1996

(Continued)

OTHER PUBLICATIONS

"Specific Heat Capacity of Metals Tables Chart", 2000 by Engineers Edge. Downloaded on Jan. 26, 2022 from https://www.engineersedge.com/materials/specific_heat_capacity_of_metals_13259.htm (Year: 2000).*

(Continued)

*Primary Examiner* — Thien S Tran

(74) *Attorney, Agent, or Firm* — Harness, Dickey & Pierce, P.L.C.

(57) ABSTRACT

A heat diffuser for use with an electrically-operated aerosol-generating device is configured to be removably coupled to the aerosol-generating device. The heat diffuser includes a non-combustible porous body for absorbing heat from an electric heating element. The porous body is thermally conductive such that, in use, air drawn through the porous body is heated by the heat absorbed by the porous body. Example embodiments also provide a heated aerosol-generating article and an aerosol-generating system, both comprising the heat diffuser.

22 Claims, 3 Drawing Sheets

(51) Int. Cl.

| | |
|---|---|
| ***A24F 40/10*** | (2020.01) |
| ***A24F 40/44*** | (2020.01) |
| ***A24F 40/46*** | (2020.01) |
| ***H05B 3/42*** | (2006.01) |

(52) U.S. Cl.

CPC ................ *H05B 3/42* (2013.01); *A24F 40/10* (2020.01); *H05B 2203/021* (2013.01)

(56) References Cited

U.S. PATENT DOCUMENTS

| | | | | |
|---|---|---|---|---|
| 3,502,084 | A | 3/1970 | Carty | |
| 5,065,776 | A | 11/1991 | Lawson et al. | |
| 5,369,723 | A | 11/1994 | Counts et al. | |
| 5,408,574 | A | 4/1995 | Deevi et al. | |
| 5,783,140 | A * | 7/1998 | Kleinfeld | F27D 3/1509 266/271 |
| 6,164,287 | A | 12/2000 | White | |
| 10,178,878 | B2 | 1/2019 | Camus et al. | |
| 10,499,690 | B2 | 12/2019 | Thorens | |
| 10,918,135 | B2 | 2/2021 | Thorens | |
| 11,116,916 | B2 | 9/2021 | Thorens | |
| 2008/0092912 | A1 | 4/2008 | Robinson et al. | |
| 2009/0095311 | A1 * | 4/2009 | Han | A24F 40/46 131/194 |
| 2010/0059070 | A1 | 3/2010 | Potter et al. | |
| 2011/0005535 | A1 | 1/2011 | Xiu | |
| 2011/0126848 | A1 | 6/2011 | Zuber et al. | |
| 2012/0006346 | A1 | 1/2012 | Inagaki | |
| 2012/0042885 | A1 | 2/2012 | Stone et al. | |
| 2013/0255702 | A1 | 10/2013 | Griffith, Jr. et al. | |
| 2014/0202479 | A1 | 7/2014 | Nicholls et al. | |
| 2014/0209112 | A1 | 7/2014 | Awty et al. | |
| 2014/0261486 | A1 | 9/2014 | Potter et al. | |
| 2014/0373856 | A1 * | 12/2014 | Zuber | A24F 47/00 131/328 |
| 2015/0013695 | A1 | 1/2015 | McNeal et al. | |
| 2015/0013696 | A1 * | 1/2015 | Plojoux | A24F 40/40 131/328 |
| 2015/0027477 | A1 | 1/2015 | Yoshino et al. | |
| 2015/0209530 | A1 | 7/2015 | White | |
| 2015/0282525 | A1 | 10/2015 | Plojoux et al. | |
| 2016/0029694 | A1 | 2/2016 | Clements et al. | |
| 2016/0206003 | A1 | 7/2016 | Yamada et al. | |
| 2016/0309782 | A1 | 10/2016 | Malgat et al. | |
| 2016/0338402 | A1 | 11/2016 | Buehler et al. | |
| 2017/0095003 | A1 | 4/2017 | Mironov | |
| 2017/0340015 | A1 | 11/2017 | Thorens | |
| 2017/0340016 | A1 | 11/2017 | Thorens | |
| 2017/0340017 | A1 | 11/2017 | Thorens | |
| 2017/0340018 | A1 | 11/2017 | Thorens | |
| 2018/0007972 | A1 | 1/2018 | Thorens | |
| 2018/0295885 | A1 | 10/2018 | Rojo-Calderon et al. | |
| 2019/0098927 | A1 | 4/2019 | Mironov | |
| 2020/0060351 | A1 | 2/2020 | Thorens | |
| 2020/0237008 | A1 | 7/2020 | Thorens | |
| 2022/0031971 | A1 | 2/2022 | Thorens | |
| 2023/0371129 | A1 | 11/2023 | Thorens | |

FOREIGN PATENT DOCUMENTS

| | | | | |
|---|---|---|---|---|
| CN | 1787753 | A | 6/2006 | |
| CN | 101500443 | A | 8/2009 | |
| CN | 101516425 | A | 8/2009 | |
| CN | 102665459 | A | 9/2012 | |
| CN | 203538389 | U | 4/2014 | |
| CN | 103929988 | A | 7/2014 | |
| CN | 104135881 | A | 11/2014 | |
| CN | 104219972 | A | 12/2014 | |
| CN | 104366697 | A | 2/2015 | |
| CN | 110897203 | A | 3/2020 | |
| DE | 102014116742 | B3 | 7/2015 | |
| EP | 2022349 | A1 | 2/2009 | |
| EP | 2046155 | A1 | 4/2009 | |
| EP | 2316286 | A1 | 5/2011 | |
| EP | 2412396 | A1 | 2/2012 | |
| EP | 2468116 | A1 | 6/2012 | |
| EP | 2807935 | A1 | 12/2014 | |
| EP | 2888963 | A1 | 7/2015 | |
| EP | 3015010 | A1 | 5/2016 | |
| GB | 1262840 | A | 2/1972 | |
| GB | 2513639 | A | 11/2014 | |
| JP | 2006-320286 | A | 11/2006 | |
| JP | 2006-525798 | A | 11/2006 | |
| JP | 2008-523934 | A | 7/2008 | |
| JP | 2009-537119 | A | 10/2009 | |
| JP | 2010-520742 | | 6/2010 | |
| JP | 2010-520742 | A | 6/2010 | |
| JP | 2014-000420 | A | 1/2014 | |
| JP | 2014-533513 | A | 12/2014 | |
| JP | 2015-510399 | A | 4/2015 | |
| JP | 2015-524260 | A | 8/2015 | |
| JP | 2019-521650 | A | 8/2019 | |
| JP | 2019-521654 | A | 8/2019 | |
| JP | 2019-521657 | A | 8/2019 | |
| JP | 2019-525726 | A | 9/2019 | |
| KR | 2008-0003908 | A | 1/2008 | |
| KR | 10-2009-0005139 | A | 1/2009 | |
| KR | 20090046820 | A | 5/2009 | |
| KR | 2014-0118983 | A | 10/2014 | |
| KR | 20150143877 | A | 12/2015 | |
| KR | 2016-0058155 | A | 5/2016 | |
| RU | 2297781 | C2 | 4/2007 | |
| RU | 2008106616 | A | 8/2009 | |
| RU | 2425608 | | 9/2010 | |
| RU | 103062 | U1 | 3/2011 | |
| RU | 2509516 | C2 | 3/2014 | |
| RU | 2573948 | C2 | 1/2016 | |
| RU | 2606069 | C2 | 1/2017 | |
| SU | 1837814 | A3 | 8/1993 | |
| WO | WO-2008015441 | A1 | 2/2008 | |
| WO | 2013098411 | A1 | 7/2013 | |
| WO | WO-2013/098405 | A2 | 7/2013 | |
| WO | WO-2013/098409 | A1 | 7/2013 | |
| WO | WO-2013/102609 | A2 | 7/2013 | |
| WO | WO-2013/190036 | A1 | 12/2013 | |
| WO | WO-2014140087 | A1 | 9/2014 | |
| WO | 2014184239 | A1 | 11/2014 | |
| WO | WO-2015/040180 | A2 | 3/2015 | |
| WO | WO-2015/082651 | A1 | 6/2015 | |
| WO | WO-2015/082654 | A1 | 6/2015 | |
| WO | WO-2015/101479 | A1 | 7/2015 | |
| WO | WO-2015101651 | A1 | 7/2015 | |
| WO | WO-2015/117705 | A2 | 8/2015 | |
| WO | WO-2015/155289 | A1 | 10/2015 | |
| WO | WO-2015/176896 | A1 | 11/2015 | |
| WO | WO-2015/177247 | A1 | 11/2015 | |
| WO | WO-2015176898 | A1 * | 11/2015 | A24B 15/167 |
| WO | WO-2016-058904 | A1 | 4/2016 | |
| WO | WO-2019/064119 | A1 | 4/2019 | |

OTHER PUBLICATIONS

"Thermal conductivities of the elements (data page)", downloaded on Jul. 23, 2019 from https://en.wikipedia.org/wiki/Thermal_conductivites_of_the_elements_(data_page) (Year: 2019).*

Japanese Office Action and English translation thereof dated May 31, 2021.

Japanese Decision to Grant and English translation thereof dated Feb. 7, 2022.

Chinese Office Action and English translation thereof dated Feb. 20, 2021.

Korean Office Action and English translation thereof dated Jul. 18, 2022.

Chinese Office Action and English translation thereof dated Sep. 17, 2021.

Extended European Search Report Application No. 16172294.7-1656 dated Dec. 5, 2016.

Extended European Search Report for European Application No. 16172295.4 dated Dec. 5, 2016.

International Search Report and Written Opinion dated Aug. 11, 2017.

(56) References Cited

OTHER PUBLICATIONS

U.S. Office Action for corresponding U.S. Appl. No. 15/626,292 dated Dec. 26, 2019.
U.S. Office Action for corresponding U.S. Appl. No. 15/626,292 dated May 21, 2020.
Russian Notice of Allowance and English translation thereof dated Jul. 15, 2020.
U.S. Notice of Allowance for corresponding U.S. Appl. No. 15/626,292 dated Jul. 31, 2020.
Written Opinion dated Aug. 5, 2018.
Russian Decision to Grant and Search Report and English translation thereof dated Sep. 25, 2020.
U.S. Notice of Allowance for corresponding U.S. Appl. No. 15/626,292 dated Nov. 12, 2020.
Chinese Notification to Grant and English translation thereof dated Dec. 15, 2021.
Japanese Decision to Grant and English translation thereof dated Dec. 6, 2021.
Japanese Office Action and English translation thereof dated May 13, 2021.
Chinese Office Action and English translation thereof dated Feb. 3, 2021.
U.S. Office Action for U.S. Appl. No. 17/165,201, dated Oct. 17, 2022.
Korean Notice of Allowance for corresponding Application No. 10-2018-7031323, dated Jan. 25, 2023, with English Translation included herewith.
Korean Notice of Allowance for corresponding Application No. 10-2018-7030600, dated Jan. 25, 2023, with English translation included herewith.
U.S. Office Action for U.S. Appl. No. 17/165,201, dated Mar. 7, 2023.
U.S. Appl. No. 15/711,261, filed Sep. 21, 2017.
U.S. Appl. No. 15/711,237, filed Sep. 21, 2017.
U.S. Appl. No. 17/412,738, filed Aug. 26, 2021.
U.S. Appl. No. 15/624,827, filed Jun. 16, 2017.
U.S. Appl. No. 16/849,187, filed Apr. 15, 2020.
U.S. Appl. No. 17/944,619, filed Sep. 14, 2022.
U.S. Appl. No. 15/711,347, filed Sep. 21, 2017.
U.S. Appl. No. 16/671,930, filed Nov. 1, 2019.
U.S. Appl. No. 17/459,265, filed Aug. 27, 2021.
U.S. Appl. No. 15/626,292, filed Jun. 19, 2017.
U.S. Appl. No. 17/165,201, filed Feb. 2, 2021.
U.S. Appl. No. 15/711,257, filed Sep. 21, 2017.
Extended European Search Report for European Patent Application 16172300.2 dated Dec. 6, 2016.
International Search Report and Written Opinion dated Jul. 28, 2017 issued in corresponding International Application No. PCT/EP2017/063055.
International Preliminary Report on Patentability dated Dec. 13, 2018 for corresponding International Application No. PCT/EP2017/063055.
"Thermal conductivities of the elements (data page)", downloaded on Jul. 23, 2019 from https://en.wikipedia.org/wiki/Thermal_conductivities_of_the_elements_(data_page) (Year: 2019).
Office Action and Search Report dated Jul. 23, 2020 issued in corresponding Russian Application No. 2018141826/03(069706).
Klinov I. Ya "Corrosion of chemical equipment and corrosion-resistant materials, Mechanical Engineering", 1967, pp. 1-469.
Office Action issued Dec. 10, 2020 in Chinese Application No. 201780029109.X.
Office Action for corresponding Russian Application No. 2018141826 dated Dec. 15, 2020.
Alexander Volochko et al., "Refractory and high-melting-point ceramic materials," Minsk, Belorussian science, 2013, cover sheet and p. 1, 52-56, retrieved on Mar. 5, 2021.
Office Action dated May 31, 2021 issued in corresponding Japanese Patent Application No. 2018-557134.
Chinese Office Action dated Jul. 22, 2021 for corresponding Chinese Application No. 201780029109 and English-language translation thereof.
Office Action dated Jul. 13, 2021 issued in corresponding Israeli Patent Application No. 262319.
Russian Notice of Allowance dated Aug. 12, 2021 for corresponding Russian Application No. 2018141826, and English-language translation thereof.
Japanese Office Action dated Nov. 8, 2021 for corresponding Japanese Application No. 2018-557134, and English-language translation thereof.
Chinese Office Action dated Feb. 28, 2022 for corresponding Chinese Application No. 201780029109.X, and English-language translation thereof.
Wang Hua, "Heating Furnaces", Published Sep. 30, 2015, p. 287.
Korean Office Action dated Jul. 18, 2022 for corresponding Korean Application No. 10-2018- 7030456, and English-language translation thereof.
European Search Report for European Application No. EP16172262.4 Dated Jan. 13, 2017.
European Search Report for European Application No. EP16172265.7 Dated Jan. 17, 2017.
European Search Report for European Application No. EP16172263.2 Dated Jan. 17, 2017.
European Search Report for European Application No. EP16172287.1 Dated Nov. 16, 2016.
Written Opinion of the International Searching Authority dated May 31, 2016 in related PCT Application No. PCT/EP2017/063061.
International Search Report and Written Opinion dated Aug. 11, 2017, for related PCT.
Application No. PCT/EP2017/063061.
Notice of Allowance issued Jul. 24, 2019 in related U.S. Appl. No. 15/711,347.
Office Action dated Dec. 30, 2019, issued in co-pending U.S. Appl. No. 15/711,237.
Office Action and search report dated Jun. 22, 2020, issued in corresponding Russian Patent Application No. 2018142136.
Office Action dated Jul. 17, 2020, issued in corresponding U.S. Appl. No. 15/711,237.
Decision to Grant dated Jul. 29, 2020, issued in corresponding Russian Application No. 2018142136/12.
Written Opinion of the International Preliminary Searching Authority dated May 8, 2018, issued in corresponding PCT Application No. PCT/EP2017/063061.
Office Action and search report dated Dec. 22, 2020, issued in corresponding Chinese Patent Application No. 201780029098.5.
Office Action dated Feb. 3, 2021, issued in corresponding U.S. Appl. No. 16/671,930.
Notice of Allowance issued May 11, 2021 in related U.S. Appl. No. 15/711,237.
Notice of Allowance issued May 17, 2021 in related U.S. Appl. No. 16/671,930.
Office Action dated May 24, 2021, issued in corresponding Japanese Patent Application No. 2018-557131.
Office Action dated Oct. 22, 2021, issued in corresponding Chinese Patent Application No. 201780029098.5. Notice of Allowance dated Jan. 19, 2022, issued in corresponding Chinese Patent Application No. 201780029098.5.
Notice of Deficiencies dated Nov. 29, 2021, issued in corresponding Israeli Patent Application No. 262309.
Office Action dated Jan. 17, 2022, issued in corresponding Japanese Patent Application No. 2018-557131.
Decision to Grant dated May 10, 2022 issued in corresponding Japanese patent application No. 2018-557131.
Office Action dated Jun. 23, 2022, issued in corresponding U.S. Appl. No. 15/711,257.
Office Action dated Jul. 18, 2022, issued in corresponding Korean Patent Application No. 10- 2018-7030595.
Office Action dated Jul. 30, 2019, issued in corresponding U.S. Appl. No. 15/624,827.
Notice of Allowance dated Jan. 24, 2020, issued in corresponding U.S. Appl. No. 15/624,827.

(56) References Cited

OTHER PUBLICATIONS

Office Action dated Jan. 31, 2022, issued in corresponding U.S. Appl. No. 16/849,187.
Notice of Allowance dated Jun. 14, 2022, issued in corresponding U.S. Appl. No. 16/849,187.
Office Action dated Oct. 6, 2022, issued in corresponding U.S. Appl. No. 15/711,261.
Office Action dated Sep. 7, 2022, issued in corresponding Japanese Patent Application No. 2021-198591.
Notice of Allowance dated Nov. 2, 2022, issued in corresponding U.S. Appl. No. 16/849,187.
Final Office Action dated Nov. 28, 2022, issued in corresponding U.S. Appl. No. 15/711,257.
Notice of Allowance dated Dec. 22, 2022, issued in corresponding U.S. Appl. No. 16/849,187.
Israeli Notice of Allowance dated Nov. 6, 2022, issued in corresponding Israeli Patent Application No. 262309.
Notice of Allowance dated Jan. 25, 2023, issued in corresponding Korean Patent Application No. 10-2018-7030595.
Notice of Allowance dated Jan. 25, 2023, issued in corresponding Korean Patent Application No. 10-2018-7030456.
Office Action dated Apr. 21, 2023, issued in corresponding U.S. Appl. No. 15/711,261.
Office Action dated Apr. 26, 2023, issued in corresponding U.S. Appl. No. 15/711,257.
Office Action dated May 9, 2023, issued in corresponding U.S. Appl. No. 15/711,257.
Office Action dated Apr. 10, 2023, issued in corresponding Japanese Patent Application No. 2021-198591.
Office Action dated Jul. 20, 2023, issued in corresponding Canadian Patent Application No. 3,014,149.
Office Action dated Jun. 27, 2023, issued in corresponding U.S. Appl. No. 17/165,201.
Office Action dated Jul. 7, 2023, issued in corresponding U.S. Appl. No. 16/849,187.
Office Action dated Jul. 24, 2023, issued in corresponding U.S. Appl. No. 17/944,619.
Office Action dated Sep. 22, 2023, issued in corresponding U.S. Appl. No. 15/711,261.
Canadian Office Action, dated Aug. 23, 2023, issued in corresponding Canadian Patent Application No. 3,014,148.
Canadian Office Action, dated Sep. 30, 2023, issued in corresponding Canadian Patent Application No. 3,016,274.
Canadian Office Action dated Oct. 20, 2023 for corresponding Canadian Patent Application No. 3,014,136.
Korean Office Action, dated Dec. 12, 2023, issued in Korean Patent Application No. 10-2023-7013274.
Notice of Allowance, dated Dec. 13, 2023, issued in U.S. Appl. No. 16/849,187.
Office Action issued Nov. 24, 2023 in U.S. Appl. No. 17/165,201.
Notice of Allowance issued Jan. 3, 2024 in U.S. Appl. No. 17/944,619.
Office Action issued Dec. 19, 2023 in U.S. Appl. No. 17/412,738.
Notice of Allowance, dated Feb. 7, 2024, issued in U.S. Appl. No. 17/165,201.
Notice of Allowance, dated Feb. 9, 2024, issued in U.S. Appl. No. 15/711,257.
Final Office Action, dated Mar. 15, 2024, issued in U.S. Appl. No. 15/711,261.
Office Action, dated Jun. 18, 2024, issued in U.S. Appl. No. 15/711,261.
Office Action, dated Sep. 3, 2024, issued in U.S. Appl. No. 18/360,961.
Advisory Action, dated Aug. 21, 2024, issued in U.S. Appl. No. 17/412,738.
Notice of Allowance, dated Oct. 1, 2024, issued in U.S. Appl. No. 17/459,265.
Office Action, dated Oct. 22, 2024, issued in U.S. Appl. No. 17/412,738.

* cited by examiner

HEAT DIFFUSER FOR AN AEROSOL-GENERATING SYSTEM

CROSS-REFERENCE TO RELATED APPLICATIONS

This patent application is a continuation of and claims priority under 35 U.S.C. § 120/121 to U.S. application Ser. No. 15/624,826, filed on Jun. 16, 2017, which is a continuation of international application no. PCT/EP2017/063056, filed on May 30, 2017, which claims priority to European Patent Application No. 16172294.7, filed on May 31, 2016, the entire contents of each of which are hereby incorporated by reference in their entirety.

BACKGROUND

Field

Some example embodiments relate to a heat diffuser for use with an aerosol-generating device, to an aerosol-generating article including the heat diffuser, and to an aerosol-generating system comprising the aerosol-generating article and an aerosol-generating device.

Description of Related Art

One type of aerosol-generating system is an electrically operated aerosol-generating system. Known handheld electrically operated aerosol-generating systems typically comprise an aerosol-generating device comprising a battery, control electronics and an electric heater for heating an aerosol-generating article designed specifically for use with the aerosol-generating device. In some examples, the aerosol-generating article comprises an aerosol-forming substrate, such as a tobacco rod or a tobacco plug, and the heater contained within the aerosol-generating device is inserted into or around the aerosol-forming substrate when the aerosol-generating article is inserted into the aerosol-generating device.

SUMMARY

In existing systems, it may be difficult to evenly heat the aerosol-forming substrate with the electric heater. This may lead to some areas of the aerosol-forming substrate being over-heated and may lead to some areas of the aerosol-forming substrate being under-heated. Both may make it difficult to maintain consistent aerosol characteristics. It would be desirable to provide means for facilitating even heating of an aerosol-forming substrate in an aerosol-generating article.

This may be a particular issue with aerosol-generating articles in which the aerosol-forming substrate is a liquid aerosol-forming substrate, since depletion of the aerosol-forming substrate may cause one or more parts of the aerosol-generating article to overheat.

At least one example embodiment provides, a heat diffuser including a non-combustible porous body configured to absorb heat from an electric heating element, the porous body being thermally conductive such that, in use, air drawn through the porous body is heated by the heat absorbed by the porous body, the heat diffuser being configured to be removably coupled to an aerosol-generating device.

In at least one example embodiment, the porous body has a surface area-to-volume ratio of at least 20 to 1.

In at least one example embodiment, the porous body includes a material having a thermal conductivity of at least 40 W/m·K at 23 degrees Celsius and a relative humidity of 50%.

In at least one example embodiment, the porous body includes a thermally conductive material selected from a group comprising of aluminium, copper, zinc, steel, silver, thermally conductive polymers, or any combination or alloy thereof.

In at least one example embodiment, the porous body is configured to be penetrated by an electric heating element forming part of the aerosol-generating device.

In at least one example embodiment, the porous body defines a cavity configured to receive the electric heating element when the heat diffuser is coupled to the aerosol-generating device.

In at least one example embodiment, the porous body is rigid.

In at least one example embodiment, the porous body is pierceable by the heating element when the heat diffuser is coupled to the aerosol-generating device.

In at least one example embodiment, the porous body is pierceable by the heating element when the heat diffuser is coupled to the aerosol-generating device.

In at least one example embodiment, the heat diffuser further includes an electric heating element thermally coupled to the porous body.

In at least one example embodiment, the electric heating element comprises a susceptor in the porous body. In at least one example embodiment, the heat diffuser further includes a piercing member at one end of the porous body.

At least one example embodiment provides a heated aerosol-generating article including a heat diffuser, a non-combustible porous body configured to absorb heat from an electric heating element, the porous body being thermally conductive such that air drawn through the porous body is heated by the heat absorbed by the porous body, the heat diffuser being configured to be removably coupled to an aerosol-generating device, the heat diffuser being located at a distal end of the aerosol-generating article, the distal end being upstream from an outlet end of the aerosol-generating article and an aerosol-forming substrate downstream of the heat diffuser, the heated aerosol-generating article is configured such that air is drawn through the heated aerosol-generating article from the distal end to the outlet end.

In at least one example embodiment, the aerosol-forming substrate is a liquid aerosol-forming substrate and the aerosol-generating article further includes a liquid retention medium configured to retain the liquid aerosol-forming substrate, the heat diffuser and the liquid retention medium being spaced apart in a longitudinal direction of the heated aerosol-generating article.

At least one example embodiment provides a heated aerosol-generating system including an electrically operated aerosol-generating device, the electrically operated aerosol-generating device including, a heat diffuser, a non-combustible porous body configured to absorb heat from an electric heating element, the porous body being thermally conductive such that, in use, air drawn through the porous body is heated by the heat absorbed by the porous body, the heat diffuser being configured to be removably coupled to an aerosol-generating device, the heat diffuser being located at a distal end of the aerosol-generating article, the distal end being upstream from an outlet end of the aerosol-generating article and an aerosol-forming substrate downstream of the heat diffuser, the heated aerosol-generating article is configured such that air is drawn through the heated aerosol-generating article from the distal end to the outlet end.

In at least one example embodiment, the electrically operated aerosol-generating device includes an electric heating element and a housing having a cavity, the heated aerosol-generating article being received in the cavity such that the heat diffuser is penetrated by the electric heating element.

In at least one example embodiment, the porous body has a surface area-to-volume ratio of at least 100 to 1.

In at least one example embodiment, the porous body has a surface area-to-volume ratio of at least 500 to 1.

In at least one example embodiment, the porous body including a material having a thermal conductivity of at least 100 W/m·K at 23 degrees Celsius and a relative humidity of 50%.

In at least one example embodiment, the porous body including a material having a thermal conductivity of at least 150 W/m·K at 23 degrees Celsius and a relative humidity of 50%.

BRIEF DESCRIPTION OF THE DRAWINGS

Some example embodiments are further described, by way of example only, with reference to the accompanying drawings in which.

DETAILED DESCRIPTION

Figure 1:
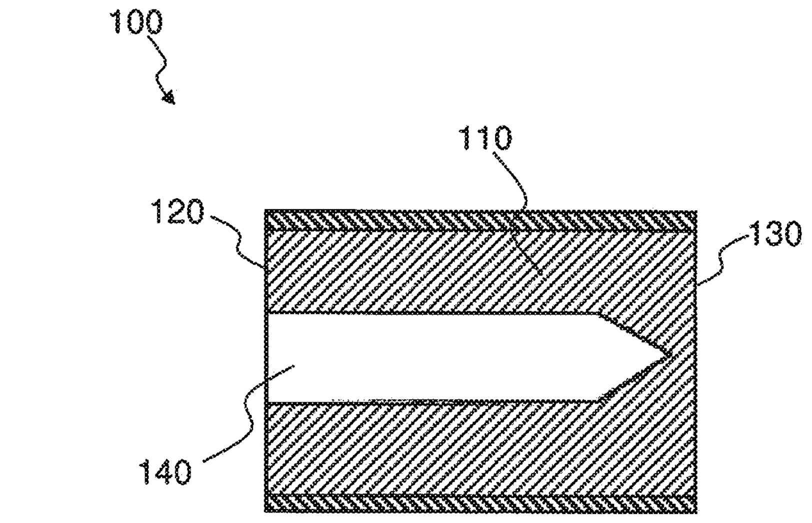
FIG. 1 shows a schematic longitudinal cross-section of a heat diffuser according to an example embodiment, for use with an electrically-operated aerosol-generating device and an aerosol-generating article.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to some example embodiments there is provided a heat diffuser for use with (configured for) an electrically-operated aerosol-generating device, the heat diffuser being configured to be removably coupled to the aerosol-generating device and comprising a non-combustible porous body for absorbing (configured to absorb) heat from an electric heating element, wherein the porous body is thermally conductive such that, in use, air drawn through the porous body is heated by the heat absorbed by the porous body. As used herein, the term "non-combustible" refers to a material that is non-combustible at a temperature of 750 degrees Celsius or below, preferably at a temperature of 400 degrees Celsius or below.

In use, the heat diffuser absorbs heat from a heating element and transfers it to air drawn through the heat diffuser so that the air can heat an aerosol-forming substrate downstream of the heat diffuser primarily by convection. This may provide more even heating of the aerosol-forming substrate relative to existing systems in which the aerosol-forming substrate is heated primarily by conduction from the heating element. For example, it may reduce or prevent areas of local high temperature, or "hot spots", from occurring in the aerosol-forming substrate that may otherwise be caused by conductive heating. This may be of particular benefit when the heat diffuser is used with aerosol-generating articles in which the aerosol-forming substrate is a liquid aerosol-forming substrate, since it may help to prevent overheating that may otherwise result from depletion of the aerosol-forming substrate. For example, where the aerosol-forming substrate comprises a liquid aerosol-forming substrate held in a liquid retention medium, the heat diffuser may help to reduce or prevent overheating of the aerosol-forming substrate or the liquid retention medium, even when the liquid retention medium is dry.

As used herein, the term "porous" is intended to encompass materials that are inherently porous as well as substantially non-porous materials that are made porous or permeable through the provision of a plurality of holes. The porous body may be formed from (may at least partially comprise) a plug of porous material, for example a metal foam. Alternatively, the porous body may be formed from a plurality of solid elements between which a plurality of apertures are provided. For example, the porous body may comprise a bundle of fibres, or a lattice of interconnected filaments. The porous material must have pores of a sufficient size that air can be drawn through the porous body through the pores. For example, the pores in the porous body may have an average transverse dimension of less than about 3.0 mm, less than about 1.0 mm, and/or less than about 0.5 mm. Alternatively or in addition, the pores may have an average transverse dimension that is greater than about 0.01 mm. For example, the pores may have an average transverse dimension that is between about 0.01 mm and about 3.0 mm, between about 0.01 mm and about 1.0 mm, and/or between about 0.01 mm and about 0.5 mm.

As used herein, the term "pores" refers to regions of a porous article that are devoid of material. For example, a transverse area of a porous body will comprise portions of the material forming the body and portions that are voids between the portions of material.

The average transverse dimension of the pores is calculated by taking the average of the smallest transverse dimension of each of the pores. The pore sizes may be substantially constant along the length of the porous body. Alternatively, the pore sizes may vary along the length of the porous body.

As used herein, the term "transverse dimension" refers to a dimension that is in a direction which is substantially perpendicular to the longitudinal direction of the porous body.

The porosity distribution of the porous body may be substantially uniform. That is, the pores within the porous body may be distributed substantially evenly over the transverse area of the porous body. The porosity distribution may differ across the transverse area of the porous body. That is, the local porosity in one or more sub-areas of the transverse area may be greater than the local porosity in one or more other sub-areas of the transverse area. For example, the local porosity in one or more sub-areas of the transverse area may be between 5 percent and 80 percent greater than the local porosity in one or more other sub-areas of the transverse area. This may enable a flow of air through the porous body.

As used herein, the term "transverse area" relates to an area of the porous body that is in a plane generally perpendicular to the longitudinal dimension of the porous body. For example, the porous body may be a rod and the transverse area may be a cross-section of the rod taken at any length along the rod, or the transverse area may be an end face of the rod.

As used herein, the term "porosity" refers to the volume fraction of void space in a porous article. As used herein, the term "local porosity" refers to the fraction of pores within a sub-area of the porous body.

By varying the porosity distribution, air flow through the porous body may be altered as desired, for example to provide improved aerosol characteristics. For example, this porosity distribution may be varied according to the air flow characteristics of an aerosol-generating system, or the temperature profile of a heating element, with which the heat diffuser is intended for use.

In some example embodiments, the local porosity may be lower towards a centre portion of the porous body. With this arrangement, the air flow through the centre portion of the porous body is decreased relative to the periphery of the porous body. This may be advantageous depending on the temperature profile of the heating element or on the airflow characteristics of the aerosol-generating system with which the heat diffuser is intended for use. For example, this arrangement may be of particular benefit when used with an internal heating element positioned in use towards a central portion of the heat diffuser, since it may allow for increased heat transfer from the heating element to the porous body.

In other examples, the local porosity may be greater towards a centre portion of the porous body. This arrangement may enable increased air flow through the centre of the porous body and may be advantageous depending on the temperature profile of the heating element or on the airflow characteristics of the aerosol-generating system with which the heat diffuser is intended for use. For example, this arrangement may be of particular benefit when used with an external heating element positioned in use around the periphery of the heat diffuser, since it may allow for increased heat transfer from the heating element to the porous body.

As porous bodies have a high surface-area-to-volume ratio, the heat diffuser may allow quick and efficient heating of air drawn through the porous body. This may allow for homogenous heating of air drawn through the porous body and, consequently, more even heating of an aerosol-forming substrate downstream of the heat diffuser.

In some example embodiments, the porous body has a surface area-to-volume ratio of at least 20 to 1, at least 100 to 1, and/or at least 500 to 1. This may provide a compact heat diffuser while allowing for particularly efficient transfer of thermal energy from the heating element to air drawn through the porous body. This may lead to quicker, and homogenous heating of air drawn through the porous body and, consequently, more even heating of an aerosol-forming substrate downstream of the heat diffuser relative to porous bodies having lower surface area to volume ratios.

In some example embodiments, the porous body has a high specific surface area. This is a measure of the total surface area of a body per unit of mass. This may provide a low mass heat diffuser with a large surface area for efficient transfer of thermal energy from the heating element to air drawn through the porous body. For example, the porous body may have a specific surface area of at least 0.01 $m^2$ per gram, at least 0.05 $m^2$ per gram, at least 0.1 m2 per gram, and/or at least 0.5 $m^2$ per gram.

The porous body may have an open cell porosity of between about 60 percent to about 90 percent void volume to material volume.

In some example embodiments, the porous body has a low resistance to draw. That is, the porous body may offer a low resistance to the passage of air through the heat diffuser. In such examples, the porous body does not substantially affect (does not affect within manufacturing tolerances and/or material tolerances) the resistance to draw of an aerosol-generating system with which the heat diffuser is intended for use. In some example embodiments, the resistance to draw (RTD) of the porous body is between about 10 to 130 mm $H_2O$, and/or between about 40 to 100 mm $H_2O$. The RTD of a body refers to the static pressure difference between the two ends of the body when it is traversed by an air flow under steady conditions in which the volumetric flow is 17.5 millilitres per second at the output end. The RTD of a specimen can be measured using the method set out in ISO Standard 6565:2002 with any ventilation blocked.

The porous body is thermally conductive. As used herein, the term "thermally conductive" refers to a material having a thermal conductivity of at least 10 W/m·K, at least 40 W/m·K, and/or at least 100 W/m·K at 23 degrees Celsius and a relative humidity of 50%. In some example embodiments, the porous body is formed from a material having a thermal conductivity of at least 40 W/m·K, at least 100 W/m·K, at least 150 W/m·K, and/or at least 200 W/m·K at 23 degrees Celsius and a relative humidity of 50%. This may reduce the thermal inertia of the heat diffuser and allow the temperature of the heat diffuser to quickly adjust to changes in the temperature of the heating element, for example where the heating element is heated according to a heating regime which changes over time, while still allowing the air drawn through the porous body to be evenly heated. Further, by having a high relatively thermal conductivity, the thermal resistance through the porous body will be lower. This may allow the temperature of portions of the porous body which are remote from the heating element in use to be at a similarly high temperature as the portions of the porous body which are closest to the heating element in use. This may provide for particularly efficient heating of air drawn through the porous body.

The porous body may be formed from any suitable material or materials. Suitable materials include, but are not limited to, aluminium, copper, steel, silver, zinc, thermally conductive polymers, or any combination or alloy thereof.

The porous body may be configured to be penetrated by an electric heating element forming part of an aerosol-generating device when the heat diffuser is coupled to the aerosol-generating device. The term "penetrated" is used to mean that the heating element at least partially extends into the porous body. Thus, the heating element may be sheathed within the porous body. With this arrangement, by the act of penetration, the heating element is brought into close proximity to, or contact with, the porous body. This may increase heat transfer between the heating element and the porous body and, consequently, to air drawn through the porous body relative to examples in which the porous body is not penetrated by the heating element.

The heating element may be shaped as a needle, pin, rod, or blade that may be inserted into the heat diffuser. The aerosol-generating device may comprise more than one heating element and reference to a heating element in this description means one or more heating elements.

The porous body may define a cavity or hole for receiving (configured to receive) the electric heating element when the heat diffuser is coupled to the aerosol-generating device.

In some example embodiments, the porous body may be rigid.

The porous body may be pierceable by the heating element when the heat diffuser is coupled to the aerosol-generating device. For example, the porous body may comprise a foam that is pierceable by the heating element. The porous body may be formed from a metal foam.

In some example embodiments, the electric heating element may be provided as part of an aerosol-generating device with which the heat diffuser is intended for use, as part of an aerosol-generating article with which the heat diffuser is intended for use, as part of the heat diffuser, or any combination thereof. The heat diffuser may comprise an electric heating element thermally coupled to the porous body. In such example embodiments, the porous body is arranged to absorb heat from the heating element and transfer it to air drawn through the porous body. With this arrangement, the heating element can be replaced by replacing the heat diffuser, while allowing the aerosol-generating device to be reused with a new heat diffuser.

The electric heating element may comprise one or more external heating elements, one or more internal heating elements, or one or more external heating elements and one or more internal heating elements. As used herein, the term "external heating element" refers to a heating element that is positioned outside of the heat diffuser when an aerosol-generating system comprising the heat diffuser is assembled. As used herein, the term "internal heating element" refers to a heating element that is positioned at least partially within the heat diffuser when an aerosol-generating system comprising the heat diffuser is assembled.

The one or more external heating elements may comprise an array of external heating elements arranged around the periphery of the heat diffuser, for example on the outer surface of the porous body. In certain examples, the external heating elements extend along the longitudinal direction of the heat diffuser. With this arrangement, the heating elements may extend along the same direction in which the heat diffuser may be inserted into and removed from a cavity in an aerosol-generating device. This may reduce interference between the heating elements and the aerosol-generating device relative to devices in which the heating elements are not aligned with the length of the heat diffuser. In some example embodiments, the external heating elements extend along the length direction of the heat diffuser and are spaced apart in the circumferential direction. Where the heating element comprises one or more internal heating elements, the one or more internal heating elements may comprise any suitable number of heating elements. For example, the heating element may comprise a single internal heating element. The single internal heating element may extend along the longitudinal direction of the heat diffuser.

Where the electric heating element forms part of the heat diffuser, the heat diffuser may further comprise one or more electrical contacts by which the electric heating element is connectable to a power source, for example a power source in the aerosol-generating device.

The electric heating element may be an electrically resistive heating element.

The electric heating element may comprise a susceptor in thermal contact with the porous body. The electric heating element may be a susceptor forming part of the heat diffuser. Preferably, the susceptor is embedded in the porous body.

As used herein, the term 'susceptor' refers to a material that can convert electromagnetic energy into heat. When located within a fluctuating electromagnetic field, eddy currents induced in the susceptor cause heating of the susceptor. As the susceptor is in thermal contact with the heat diffuser, the heat diffuser is heated by the susceptor.

In such example embodiments, the heat diffuser is designed to engage with an electrically-operated aerosol-generating device comprising an induction heating source. The induction heating source, or inductor, generates the fluctuating electromagnetic field for heating (configured to heat) a susceptor located within the fluctuating electromagnetic field. In use, the heat diffuser engages with the aerosol-generating device such that the susceptor is located within the fluctuating electromagnetic field generated by the inductor.

The susceptor may be in the form of a pin, rod, or blade. The susceptor has a length of between 5 mm and 15 mm, for example between 6 mm and 12 mm, or between 8 mm and 10 mm. The susceptor has a width of between 1 mm and 5 mm and may have a thickness of between 0.01 mm and 2 mm. for example between 0.5 mm and 2 mm. An example embodiment of a susceptor may have a thickness of between 10 micrometres and 500 micrometres, and/or between 10 and 100 micrometers. If the susceptor has a constant cross-section, for example a circular cross-section, it has a width or diameter of between 1 mm and 5 mm.

The susceptor may be formed from any material that can be inductively heated to a temperature sufficient to generate an aerosol from an aerosol-forming substrate downstream of the heat diffuser. Susceptors may comprise a metal or carbon. A susceptor may comprise a ferromagnetic material, for example ferritic iron, or a ferromagnetic steel or stainless steel. A susceptor may be, or comprise, aluminium. Susceptors may be formed from 400 series stainless steels, for example grade 410, or grade 420, or grade 430 stainless steel. Different materials will dissipate different amounts of energy when positioned within electromagnetic fields having similar values of frequency and field strength. Thus, parameters of the susceptor such as material type, length, width, and thickness may all be altered to provide a desired power dissipation within a known electromagnetic field.

Susceptors may be heated to a temperature in excess of 250 degrees Centigrade. Susceptors may comprise a non-metallic core with a metal layer disposed on the non-metallic core, for example metallic tracks formed on a surface of a ceramic core.

A susceptor may have a protective external layer, for example a protective ceramic layer or protective glass layer encapsulating the susceptor. The susceptor may comprise a protective coating formed by a glass, a ceramic, or an inert metal, formed over a core of the susceptor.

The heat diffuser may contain a single susceptor. Alternatively, the heat diffuser may comprise more than one susceptor.

Heat diffusers according to some example embodiments may include a piercing member at one end of the porous body. This may allow the heat diffuser to pierce a seal at an end of an aerosol-generating article with which it is intended for use when the heat diffuser is engaged with the aerosol-generating article. Where the aerosol-generating article comprises a frangible capsule, for example a frangible capsule containing an aerosol-forming substrate, the piercing member may allow the heat diffuser to pierce the frangible capsule when the heat diffuser is engaged with the aerosol-generating article.

The downstream end of the piercing member has a cross-sectional area that is smaller than the cross-sectional area of the region of the piercing member immediately upstream of the downstream end. In an example embodiment, the cross-sectional area of the piercing member narrows towards a tapered tip at its downstream end.

The piercing member may be formed by the porous body. Alternatively, the piercing member may be a separate component attached at the downstream end of the porous body.

According to some example embodiments, there is provided a heated aerosol-generating article for use with an electrically-operated aerosol-generating device, the aerosol-generating article having an outlet end and a distal end upstream from the outlet end. The article includes a heat diffuser according to any of the example embodiments described above, the heat diffuser being located at the distal end of the aerosol-generating article and an aerosol-forming substrate downstream of the heat diffuser. The heated aerosol-generating article is configured such that, in use, air can be drawn through the heated aerosol-generating article from the distal end to the outlet end.

As used herein, the term "heated aerosol-generating article" refers to an article comprising an aerosol-generating substrate that, when heated, releases volatile compounds that can form an aerosol.

The aerosol-forming substrate may be a solid aerosol-forming substrate. Alternatively, the aerosol-forming substrate may comprise both solid and liquid components. The aerosol-forming substrate may comprise tobacco. The aerosol-forming substrate may comprise a tobacco-containing material containing volatile tobacco flavour compounds which are released from the substrate upon heating. The aerosol-forming substrate may comprise a non-tobacco material. The aerosol-forming substrate may comprise tobacco-containing material and non-tobacco containing material.

The aerosol-forming substrate may further comprise an aerosol former that facilitates the formation of a dense and stable aerosol. Examples of suitable aerosol formers are glycerine and propylene glycol.

The aerosol-forming substrate may comprise a solid aerosol-forming substrate. The aerosol-forming substrate may comprise a tobacco-containing material containing volatile tobacco flavour compounds which are released from the substrate upon heating. The aerosol-forming substrate may comprise a non-tobacco material.

The aerosol-forming substrate may include at least one aerosol-former. As used herein, the term 'aerosol former' is used to describe any suitable known compound or mixture of compounds that, in use, facilitates formation of an aerosol. Suitable aerosol formers are substantially resistant to thermal degradation at the operating temperature of the aerosol-generating article. Examples of suitable aerosol formers are glycerine and propylene glycol. Suitable aerosol-formers include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Some aerosol formers of example embodiments are polyhydric alcohols or mixtures thereof, such as propylene glycol, triethylene glycol, 1,3-butanediol and, most preferred, glycerine. The aerosol-forming substrate may comprise a single aerosol former. Alternatively, the aerosol-forming substrate may comprise a combination of two or more aerosol formers. The aerosol-forming substrate may have an aerosol former content of greater than 5 percent on a dry weight basis. The aerosol-forming substrate may have an aerosol former content of between approximately 5 percent and approximately 30 percent on a dry weight basis. The aerosol-forming substrate may have an aerosol former content of approximately 20 percent on a dry weight basis.

The aerosol-forming substrate may comprise a liquid aerosol-forming substrate. The liquid aerosol-forming substrate may comprise a nicotine solution. The liquid aerosol-forming substrate comprises a tobacco-containing material comprising volatile tobacco flavour compounds which are released from the liquid upon heating. The liquid aerosol-forming substrate may comprise a non-tobacco material. The liquid aerosol-forming substrate may include water, solvents, ethanol, plant extracts and natural or artificial flavours. The liquid aerosol-forming substrate may further comprise an aerosol former.

As used herein, the term "liquid aerosol-forming substrate" refers to an aerosol-forming substrate that is in a liquid rather than a solid form. A liquid aerosol-forming substrate may be at least partially absorbed by a liquid retention medium. A liquid-aerosol-forming substrate may include an aerosol-forming substrate in the form of a gel.

In some example embodiments, the aerosol-generating article comprises a liquid aerosol-forming substrate and a liquid retention medium for retaining (configured to retain) the liquid aerosol-forming substrate.

As used herein, the term "liquid retention medium" refers to a component that is capable of releasably retaining a liquid aerosol-forming substrate. The liquid retention medium may be, or may comprise, a porous or fibrous material that absorbs or otherwise retains a liquid aerosol-forming substrate that it is brought into contact with while allowing the liquid aerosol-forming substrate to be released by vaporisation.

The liquid retention medium may comprise an absorbent material, for example an absorbent polymeric material. Examples of liquid retention materials include fibrous polymers and porous polymers such as open-cell foams. The liquid retention medium may comprise a fibrous cellulose acetate or a fibrous cellulose polymer. The liquid retention medium may comprise a porous polypropylene material. Materials capable of retaining a liquid are known.

The liquid retention medium is either located within an air-flow path through the heated aerosol-generating article or defines at least a portion of an air-flow path through the aerosol-generating article. In an example embodiment, one or more holes defined through the liquid retention medium define a portion of the air-flow path through the heated aerosol-generating article between the distal end of the article and the outlet end of the article.

The liquid retention medium may be in the form of a tube having a central lumen. Walls of the tube would then be formed from, or comprise, a suitable liquid-retention material.

The liquid aerosol-forming substrate may be incorporated into the liquid retention medium immediately prior to use. For example, a dose of liquid aerosol-forming substrate may be injected into the liquid retention medium immediately prior to use.

Articles according to some example embodiments may comprise a liquid aerosol-forming substrate contained within a frangible capsule. The frangible capsule may be located between the distal end and the mid-point of the article.

As used herein, the term "frangible capsule" refers to a capsule that is capable of containing a liquid aerosol-forming substrate and releasing the liquid aerosol-forming substrate when broken or ruptured. The frangible capsule may be formed from, or comprise, a brittle material that is broken by a vaper to release its liquid aerosol-forming substrate contents. For example the capsule may be broken by external force such as finger pressure, or by contact with a piercing or rupturing element.

The frangible capsule may be spheroid, for example spherical or ovoid, having a maximum dimension of between 2 mm and 8 mm, for example between 4 mm and 6 mm. The frangible capsule may contain a volume of between 20 and 300 microlitres, for example between 30 and 200 microlitres. Such a range may provide between 10 and 150 applications of negative pressure by a vaper.

The frangible capsule may have a brittle shell, or may be shaped to facilitate rupture when subjected to external force. The frangible capsule may be configured to be ruptured by application of external force. For example, the frangible capsules may be configured to rupture at a specific defined external force, thereby releasing the liquid-aerosol-forming substrate. The frangible capsule may be configured with a weakened or brittle portion of its shell to facilitate rupture. The frangible capsule may be arranged to engage with a piercing element to break the capsule and release the liquid aerosol-forming substrate. Preferably the frangible capsule has a burst strength of between about 0.5 and 2.5 kilograms force (kgf), for example between 1.0 and 2.0 kgf.

The shell of the frangible capsule may comprise a suitable polymeric material, for example a gelatin based material. The shell of the capsule may comprise a cellulose material or a starch material.

The liquid aerosol-forming substrate may be releasably contained within the frangible capsule and the article further comprises a liquid retention medium located in proximity to the frangible capsule for retaining (configured to retain) the liquid aerosol-forming substrate within the article after its release from the frangible capsule.

The liquid retention medium is may be capable of absorbing between 105% and 110% of the total volume of liquid contained within the frangible capsule. This helps to prevent leakage of liquid aerosol-forming substrate from the article after the frangible capsule has been broken to release its contents. The liquid retention medium may be between 90% and 95% saturated after release of the liquid aerosol-forming substrate from the frangible capsule.

The frangible capsule may be located adjacent to the liquid retention medium within the article such that the liquid-aerosol-forming substrate released from the frangible capsule can contact and be retained by the liquid retention medium. The frangible capsule may be located within the liquid retention medium. For example, the liquid retention medium may be in the form of a tube having a lumen and the frangible capsule containing the liquid aerosol-forming substrate may be located within the lumen of the tube.

Where the aerosol-forming substrate is a solid aerosol-forming substrate, the solid aerosol-forming substrate may be immediately downstream of the heat diffuser. For example, the solid aerosol-forming substrate may abut the heat diffuser. In other example embodiments, the solid aerosol-forming substrate may be spaced apart in the longitudinal direction from the heat diffuser.

In some example embodiments, the aerosol-forming substrate is a liquid aerosol-forming substrate and the article further comprises a liquid retention medium for retaining the liquid aerosol-forming substrate. In such example embodiments, the liquid retention medium may be immediately downstream of the heat diffuser. For example, the liquid retention medium may abut the heat diffuser. In other embodiments, the liquid retention medium may be spaced apart in the longitudinal direction from the heat diffuser.

With this arrangement, conductive heat transfer between the heat diffuser and the liquid retention medium, or a solid aerosol-forming substrate, may be reduced. This may further reduce or prevent areas of local high temperature, or "hot spots", from occurring in the liquid retention medium, or the aerosol-forming substrate, that may otherwise be caused by conductive heating.

Aerosol-generating articles according to some example embodiments may further comprise a support element located immediately downstream of the aerosol-forming substrate or, where the article comprises a liquid retention medium for retaining a liquid aerosol-forming substrate, located immediately downstream of the liquid retention medium. The support element may abut the aerosol-forming substrate or the liquid retention medium.

The support element may be formed from any suitable material or combination of materials. For example, the support element may be formed from one or more materials selected from the group consisting of: cellulose acetate; cardboard; crimped paper, such as crimped heat resistant paper or crimped parchment paper; and polymeric materials, such as low density polyethylene (LDPE). In an example embodiment, the support element is formed from cellulose acetate. The support element may comprise a hollow tubular element. For example, the support element comprises a hollow cellulose acetate tube. The support element has an external diameter that is approximately equal to the external diameter of the aerosol-generating article.

The support element may have an external diameter of between approximately 5 millimetres and approximately 12 millimetres, for example of between approximately 5 millimetres and approximately 10 millimetres or of between approximately 6 millimetres and approximately 8 millimetres. For example, the support element may have an external diameter of 7.2 millimetres+/−10 percent.

The support element may have a length of between approximately 5 millimetres and approximately 15 mm. In a preferred embodiment, the support element has a length of approximately 8 millimetres.

An aerosol-cooling element may be located downstream of the aerosol-forming substrate, for example an aerosol-cooling element may be located immediately downstream of a support element, and may abut the support element. The aerosol-cooling element may be located immediately downstream of the aerosol-forming substrate or, where the article comprises a liquid retention medium for retaining a liquid aerosol-forming substrate, immediately downstream of the liquid retention medium. For example, the aerosol-cooling element may abut the aerosol-forming substrate or the liquid retention medium.

The aerosol-cooling element may have a total surface area of between approximately 300 square millimetres per millimetre length and approximately 1000 square millimetres per millimetre length. In an example embodiment, the aerosol-cooling element has a total surface area of approximately 500 square millimetres per millimetre length.

The aerosol-cooling element may have a relatively low resistance to draw. That is, the aerosol-cooling element offers a low resistance to the passage of air through the aerosol-generating article. In some example embodiments, the aerosol-cooling element does not substantially affect the resistance to draw of the aerosol-generating article.

The aerosol-cooling element may comprise a plurality of longitudinally extending channels. The plurality of longitudinally extending channels may be defined by a sheet material that has been one or more of crimped, pleated, gathered and folded to form the channels. The plurality of longitudinally extending channels may be defined by a single sheet that has been one or more of crimped, pleated, gathered and folded to form multiple channels. Alternatively, the plurality of longitudinally extending channels may be defined by multiple sheets that have been one or more of crimped, pleated, gathered and folded to form multiple channels.

In some example embodiments, the aerosol-cooling element may comprise a gathered sheet of material selected from the group consisting of metallic foil, polymeric material, and substantially non-porous paper or cardboard. In some example embodiments, the aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), and aluminium foil.

In an example embodiment, the aerosol-cooling element comprises a gathered sheet of biodegradable material. For example, a gathered sheet of non-porous paper or a gathered sheet of biodegradable polymeric material, such as polylactic acid or a grade of Mater-Bi® (a commercially available family of starch based copolyesters) may be used. The aerosol-cooling element may comprise a gathered sheet of polylactic acid.

The aerosol-cooling element may be formed from a gathered sheet of material having a specific surface area of between approximately 10 square millimetres per milligram and approximately 100 square millimetres per milligram weight. In some example embodiments, the aerosol-cooling element may be formed from a gathered sheet of material having a specific surface area of approximately 35 mm2/mg.

The aerosol-generating article may comprise a mouthpiece located at the outlet end of the aerosol-generating article. The mouthpiece may be located immediately downstream of an aerosol-cooling element and may abut the aerosol-cooling element. The mouthpiece may be located immediately downstream of the aerosol-forming substrate or, where the article comprises a liquid retention medium for retaining a liquid aerosol-forming substrate, located immediately downstream of the liquid retention medium. In such example embodiments, the mouthpiece may abut the aerosol-forming substrate, or the liquid retention medium. The mouthpiece may comprise a filter. The filter may be formed from one or more suitable filtration materials. Many such filtration materials are known in the art. In one example embodiment, the mouthpiece may comprise a filter formed from cellulose acetate tow.

The mouthpiece has an external diameter that is approximately equal to the external diameter of the aerosol-generating article. The mouthpiece may have an external diameter of a diameter of between approximately 5 millimetres and approximately 10 millimetres, for example of between approximately 6 millimetres and approximately 8 millimetres. In an example embodiment, the mouthpiece has an external diameter of 7.2 millimetres+/−10%.

The mouthpiece may have a length of between approximately 5 millimetres and approximately 20 millimetres. For example, the mouthpiece may have a length of from about 7 mm to about 12 mm.

The elements of the aerosol-forming article may be circumscribed by an outer wrapper, for example in the form of a rod. The wrapper may circumscribe at least a downstream portion of the heat diffuser. In some example embodiments, the wrapper circumscribes the heat diffuser along substantially the entire length of the heat diffuser. The outer wrapper may be formed from any suitable material or combination of materials. Preferably, the outer wrapper is non-porous.

The aerosol-generating article may be substantially cylindrical in shape. The aerosol-generating article may be substantially elongate. The aerosol-generating article may have a length and a circumference substantially perpendicular to the length. The aerosol-forming substrate or a porous carrier material in which the aerosol-forming substrate is absorbed during use, may be substantially cylindrical in shape. The aerosol-forming substrate or the porous carrier material may be substantially elongate. The aerosol-forming substrate, or the porous carrier material, may also have a length and a circumference substantially perpendicular to the length.

The aerosol-generating article may have an external diameter of between approximately 5 millimetres and approximately 12 millimetres, for example of between approximately 6 millimetres and approximately 8 millimetres. In an example embodiment, the aerosol-generating article has an external diameter of 7.2 millimetres+/−10 percent.

The aerosol-generating article may have a total length between approximately 30 mm and approximately 100 mm. In one example embodiment, the aerosol-generating article has a total length of approximately 45 mm.

The aerosol-forming substrate or, where applicable, the liquid retention medium, may have a length of between about 7 mm and about 15 mm. In one embodiment, the aerosol-forming substrate, or the liquid retention medium, may have a length of approximately 10 mm. Alternatively, the aerosol-forming substrate, or the liquid retention medium, may have a length of approximately 12 mm.

The aerosol-generating substrate or liquid retention medium, has an external diameter that is approximately equal to the external diameter of the aerosol-generating article. The external diameter of the aerosol-forming substrate, or the liquid retention medium, may be between approximately 5 mm and approximately 12 mm. In one example embodiment, the aerosol-forming substrate, or the liquid retention medium, may have an external diameter of approximately 7.2 mm+/−10 percent.

In use, the heat diffuser heats air drawn through it to between 200 and 220 degrees Celsius. The air cools to about 100 degrees in the aerosol cooling element. According to some example embodiments, there is provided a heated aerosol-generating system comprising an electrically operated aerosol-generating device and a heated aerosol-generating article according to any of the example embodiments discussed above.

As used herein, the term 'aerosol-generating device' relates to a device that interacts with an aerosol-forming substrate to generate an aerosol. An electrically operated aerosol-generating device is a device comprising one or more components used to supply energy from an electrical power supply to an aerosol-forming substrate to generate an aerosol.

An aerosol-generating device may be described as a heated aerosol-generating device, which is an aerosol-generating device comprising a heating element. The heating element or heater is used to heat an aerosol-forming substrate of an aerosol-generating article to generate an aerosol, or the solvent-evolving substrate of a cleaning consumable to form a cleaning solvent.

An aerosol-generating device may be an electrically heated aerosol-generating device, which is an aerosol-generating device comprising a heating element that is operated by electrical power to heat an aerosol-forming substrate of an aerosol-generating article to generate an aerosol.

The aerosol-generating device of the aerosol-generating system may comprise: a housing having a cavity for receiving the aerosol-generating article and a controller configured to control the supply of power from a power supply to an electric heating element of the system.

The electric heating element may form part of the aerosol-generating article, part of the heat diffuser, part of the aerosol-generating device, or any combination thereof.

In some example embodiments, the electric heating element forms part of the device.

The electric heating element may comprise one or more heating elements.

In some example embodiments, the electrically operated aerosol-generating device comprises an electric heating element and a housing having a cavity, and wherein the heated aerosol-generating article is received in the cavity such that the heat diffuser is penetrated by the electric heating element. The heating element may be shaped as a needle, pin, rod, or blade that may be inserted into the heat diffuser.

According to some example embodiments, there is provided an aerosol-generating system comprising a heat diffuser according to any of the example embodiments described above, an aerosol-generating article, and an aerosol-generating device. In such example embodiments, the heat diffuser and the aerosol-generating article are separate components which may be received independently into a cavity of the device. The aerosol-generating article includes an aerosol-forming substrate. The aerosol-forming substrate may be located at the upstream end of the aerosol-generating article. The aerosol-forming substrate may be a liquid aerosol-forming substrate. In such example embodiments, the aerosol-generating article may include a liquid retention medium for retaining the liquid aerosol-forming substrate during use. The liquid retention medium may be located at the upstream end of the aerosol-generating article. The article may include one or more of a support element, an aerosol-cooling element, and a mouthpiece, downstream of the aerosol-forming substrate, as described above.

Aerosol-generating systems according to some example embodiments include an electric heating element. The electric heating element may comprise one or more external heating elements, one or more internal heating elements, or one or more external heating elements and one or more internal heating elements. As used herein, the term "external heating element" refers to a heating element that is positioned outside of the heat diffuser when an aerosol-generating system comprising the heat diffuser is assembled. As used herein, the term "internal heating element" refers to a heating element that is positioned at least partially within the heat diffuser when an aerosol-generating system comprising the heat diffuser is assembled.

The one or more external heating elements may comprise an array of external heating elements arranged around the inner surface of the cavity. In certain examples, the external heating elements extend along the longitudinal direction of the cavity. With this arrangement, the heating elements may extend along the same direction in which the heat diffuser and the article are inserted into and removed from the cavity. This may reduce interference between the heating elements and the heat diffuser relative to devices in which the heating elements are not aligned with the length of the cavity. In some example embodiments, the external heating elements extend along the length direction of the cavity and are spaced apart in the circumferential direction. Where the heating element comprises one or more internal heating elements, the one or more internal heating elements may comprise any suitable number of heating elements. For example, the heating element may comprise a single internal heating element. The single internal heating element may extend along the longitudinal direction of the cavity.

The electric heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium- titanium- zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation, 1999 Broadway Suite 4300, Denver Colo. In composite materials, the electrically resistive material may optionally be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise Kapton®, all-polyimide or mica foil. Kapton® is a registered trade mark of E.I. du Pont de Nemours and Company, 1007 Market Street, Wilmington, Del. 19898, United States of America.

Where the electric heating element comprises a susceptor in thermal contact with the porous body of the heat diffuser, the aerosol-generating device comprises an inductor arranged to generate a fluctuating electromagnetic field within the cavity and an electrical power supply connected to the inductor. The inductor may comprise one or more coils that generate a fluctuating electromagnetic field. The coil or coils may surround the cavity.

The device may be capable of generating a fluctuating electromagnetic field of between 1 and 30 MHz, for example, between 2 and 10 MHz, for example between 5 and 7 MHz. Preferably the device is capable of generating a fluctuating electromagnetic field having a field strength (H-field) of between 1 and 5 kA/m, for example between 2 and 3 kA/m, for example about 2.5 kA/m.

Preferably, the aerosol-generating device is a portable or handheld aerosol-generating device to hold between the fingers of a single hand.

The aerosol-generating device may be substantially cylindrical in shape.

The aerosol-generating device may have a length of between approximately 70 millimetres and approximately 120 millimetres.

The device may comprise a power supply for supplying (configured to supply) electrical power to the electric heating element. The power supply may be any suitable power supply, for example a DC voltage source such as a battery. In one example embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The controller may be a simple switch. Alternatively the controller may be electric circuitry and may comprise one or more microprocessors or microcontrollers.

The controller may be implemented in hardware, a processor configured to execute software, firmware, or any combination thereof, for example. When the controller is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller. CPUs, DSPs, ASICs and FPGAs may generally be referred to as processing devices.

In the event where the controller is a processor executing software, the processor is configured as a special purpose machine to execute the software, stored in a storage medium (e.g., a memory), to perform the functions of the controller. In such an embodiment, the processor may include one or more Central Processing Units (CPUs), digital signal processors (DSPs), application-specific-integrated-circuits (ASICs), field programmable gate arrays (FPGAs) computers.

As used herein, the terms 'upstream' and 'downstream' are used to describe the relative positions of elements, or portions of elements, of the heat diffuser, aerosol-generating article, or aerosol-generating device, in relation to the direction in which air is drawn through the system during use thereof.

As used herein, the term 'longitudinal' is used to describe the direction between the upstream end and the downstream end of the heat diffuser, aerosol-generating article, or aerosol-generating device and the term 'transverse' is used to describe the direction perpendicular to the longitudinal direction.

As used herein, the term 'diameter' is used to describe the maximum dimension in the transverse direction of the heat diffuser, aerosol-generating article, or aerosol-generating device. As used herein, the term 'length' is used to describe the maximum dimension in the longitudinal direction.

As used herein, the term 'removably coupled' is used to mean that two or more components of the system, such as the heat diffuser and the device, or the article and the device can be coupled and uncoupled from one another without significantly damaging either component. For example, the article may be removed from the device when the aerosol-forming substrate has been consumed. The heat diffuser may be disposable. The heat diffuser may be reusable.

Features described in relation to one or more aspects may equally be applied to other aspects of example embodiments. In particular, features described in relation to the heat diffuser of the first aspect may be equally applied to the article of the second aspect or the system of the third aspect, and vice versa.

FIG. 1 shows a heat diffuser 100 according to an example embodiment. The heat diffuser 100 includes a porous body 110 in the form of a cylindrical plug of thermally conductive material. The porous body 110 has an upstream or distal end 120 and a downstream or proximal end 130, opposite to the upstream end 120. A cavity in the form of a slot 140 is formed in the upstream end 120 of the porous body 110 and is arranged to receive a blade-shaped heating element, as discussed below in relation to FIG. 3. The pores in the porous body 110 are interconnected to form a plurality of air flow passages extending through the porous body 110 from its upstream end 120 to its downstream end 130.

Figure 2:
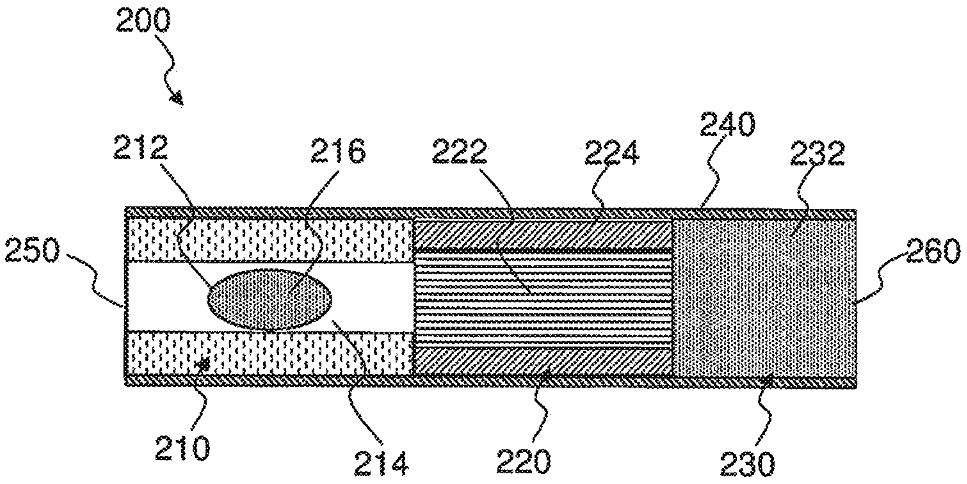
FIG. 2 shows a schematic longitudinal cross-section of an aerosol-generating article for use with the heat diffuser of FIG. 1 according to an example embodiment.

FIG. 2 illustrates an aerosol-generating article 200 for use with the heat diffuser 100 of FIG. 1 according to an example embodiment. The aerosol-generating article 200 comprises three elements arranged in the following coaxial alignment: a tubular liquid retention medium 210, an aerosol-cooling element 220, and a mouthpiece 230. Each of these three elements is a substantially cylindrical element, each having substantially the same diameter. These three elements are arranged sequentially and are circumscribed by a non-porous outer wrapper 240 to form a cylindrical rod.

The aerosol-generating article 200 has a distal or upstream end 250 and a proximal or outlet end 260, opposite to the upstream end 250. Once assembled, the total length of the aerosol-generating article 200 is about 33 mm about 45 mm and the diameter is about 7.2 mm.

The liquid retention medium 210 is located at the extreme distal or upstream end 250 of the aerosol-generating article 200. In the example embodiment illustrated in FIG. 2, the article 200 includes a frangible capsule 212 located within the lumen 214 of the liquid retention medium 210. The frangible capsule 212 contains a liquid aerosol-forming substrate 216.

The tubular liquid retention medium 210 has a length of 8 mm and is formed from fibrous cellulose acetate material. The liquid retention medium has a capacity to absorb 35 microlitres of liquid. The lumen 214 of the tubular liquid retention medium 210 provides an air flow path through the liquid retention medium 210 and also acts to locate the frangible capsule 212. The material of the liquid retention medium may be any other suitable fibrous or porous material.

The frangible capsule 212 is shaped as an oval spheroid and has the long dimension of the oval aligned with the axis of the lumen 214. The oval spheroid shape of the capsule may mean that it is easier to break than if it was circular spherical in shape, but other shapes of capsule may be used. The capsule 212 has an outer shell comprising a gelatin based polymeric material surrounding a liquid aerosol-forming substrate.

The liquid aerosol-forming substrate 216 comprises propylene glycol, nicotine extract, and 20 weight percent water. A wide range of flavourants may be optionally added. A wide range of aerosol-formers may be used as alternative, or in addition to, propylene glycol. The capsule is about 4 mm in length and contains a volume of about 33 microlitres of liquid aerosol-forming substrate.

The aerosol-cooling element 220 is located immediately downstream of and abuts the liquid retention medium 210. In use, volatile substances released from the aerosol-forming substrate 216 pass along the aerosol-cooling element 220 towards the outlet end 260 of the aerosol-generating article 200. The volatile substances may cool within the aerosol-cooling element 220 to form an aerosol. In the embodiment illustrated in FIG. 2, the aerosol-cooling element 220 comprises a crimped and gathered sheet 222 of polylactic acid circumscribed by a wrapper 224. The crimped and gathered sheet 222 of polylactic acid defines a plurality of longitudinal channels that extend along the length of the aerosol-cooling element 220.

The mouthpiece 230 is located immediately downstream of and abuts the aerosol-cooling element 220. In the example embodiment illustrated in FIG. 2, the mouthpiece 230 comprises a cellulose acetate tow filter 232 of low filtration efficiency.

To assemble the aerosol-generating article 200, the three cylindrical elements described above are aligned and tightly wrapped within the outer wrapper 240. In the example embodiment illustrated in FIG. 2, the outer wrapper 240 is formed from a non-porous sheet material. In other examples, the outer wrapper may comprise a porous material, such as cigarette paper.

Figure 3:
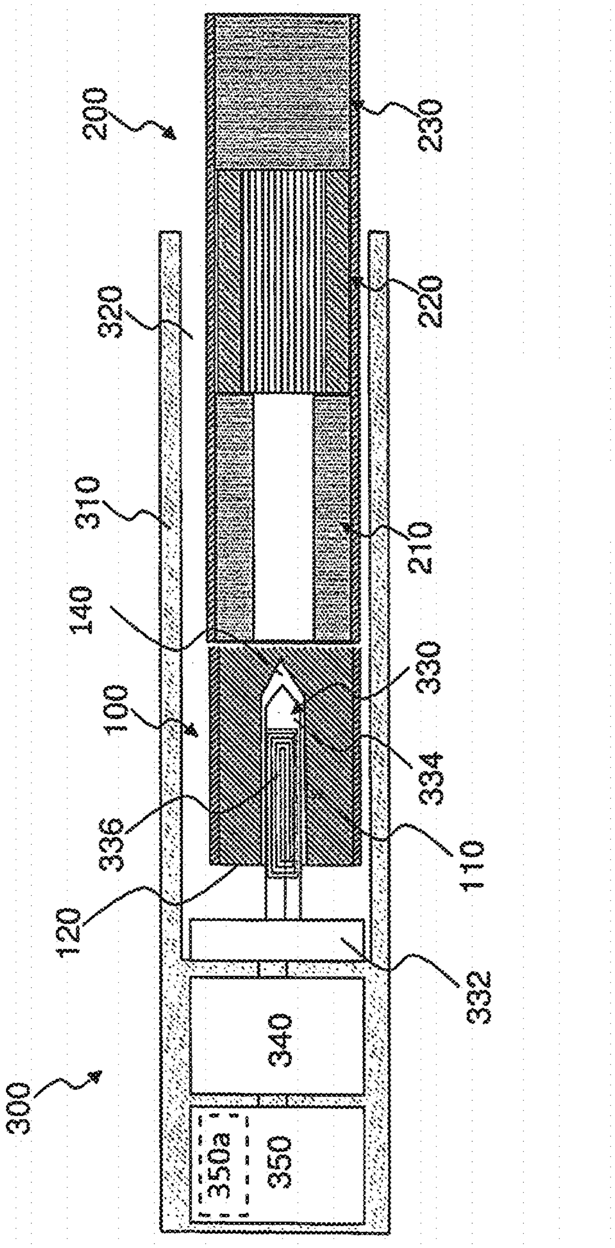
FIG. 3 shows a schematic view of an aerosol-generating system including the aerosol-generating article of FIG. 2 and the heat diffuser of FIG. 1 according to an example embodiment.

FIG. 3 shows an aerosol-generating system in accordance with an example embodiment. The aerosol-generating system comprises the heat diffuser 100, the aerosol-generating article 200, and an aerosol-generating device 300.

The aerosol-generating device includes a housing 310 defining a cavity 320 for receiving the heat diffuser 100 and the aerosol-generating article 200. The device 300 further includes a heater 330 comprising a base portion 332 and a heating element in the form of a heater blade 334 that penetrates the heat diffuser 100 so that a portion of the heater blade 334 extends into the slot 140 in the porous body 110 when the heat diffuser 100 is received in the cavity 320, as shown in FIG. 3. The heater blade 334 comprises resistive heating tracks 336 for resistively heating the heat diffuser 100. A controller 340 controls the operation of the device 300, including the supply of electrical current from a battery 350 to the resistive heating tracks 336 of the heater blade 334.

The controller 340 may be implemented in hardware, a processor configured to execute software, firmware, or any combination thereof, for example. When the controller 340 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller. CPUs, DSPs, ASICs and FPGAs may generally be referred to as processing devices.

In the event where the controller 340 is a processor executing software, the processor is configured as a special purpose machine to execute the software, stored in a storage medium (e.g., a memory 350*a*), to perform the functions of the controller 340. In such an embodiment, the processor may include one or more Central Processing Units (CPUs), digital signal processors (DSPs), application-specific-integrated-circuits (ASICs), field programmable gate arrays (FPGAs) computers.

In the example shown in FIG. 3, the frangible capsule has been ruptured prior to insertion of the article 200 into the cavity 320 of the device 300. Thus, the liquid aerosol-forming substrate is shown as being absorbed into the liquid retention medium 210. In other examples, the frangible capsule may be ruptured following or during insertion of the aerosol-generating article 200 into the cavity 320 of the device 300. For example, the heat diffuser 100 may have a piercing member at its downstream end which is arranged to engage with and rupture the frangible capsule during insertion of the aerosol-generating article 200 into the cavity 320.

During use, the controller 340 supplies electrical current from the battery 350 to the resistive heating tracks 336 to heat the heater blade 334. Thermal energy is then absorbed by the porous body 110 of the heat diffuser 100 to heat the porous body 110. Air is drawn into the device 300 through air inlets (not shown) and subsequently through the heat diffuser 100 and along the aerosol-generating article 200 by applying a negative pressure from the distal end 120 of the heat diffuser 100 to the outlet end 260 of the aerosol-generating article 200. As air is drawn through the porous body 110, the air is heated by the heat absorbed by the porous body 110 from the heater blade 334 before passing through the liquid retention medium 210 of the aerosol-generating article 200 to heat the liquid aerosol-forming substrate in the liquid retention medium 210. Preferably, the air is heated by the heat diffuser to between 200 and 220 degrees Celsius. The air then cools to about 100 degrees as it is drawn through the aerosol cooling element.

During the heating cycle, at least some of the one or more volatile compounds within the aerosol-generating substrate are evaporated. The vaporised aerosol-forming substrate is entrained in the air flowing through the liquid retention medium 210 and condenses within the aerosol-cooling element 220 and the mouthpiece portion 230 to form an inhalable aerosol, which exits the aerosol-generating article 200 at its outlet end 260.

Figure 4:
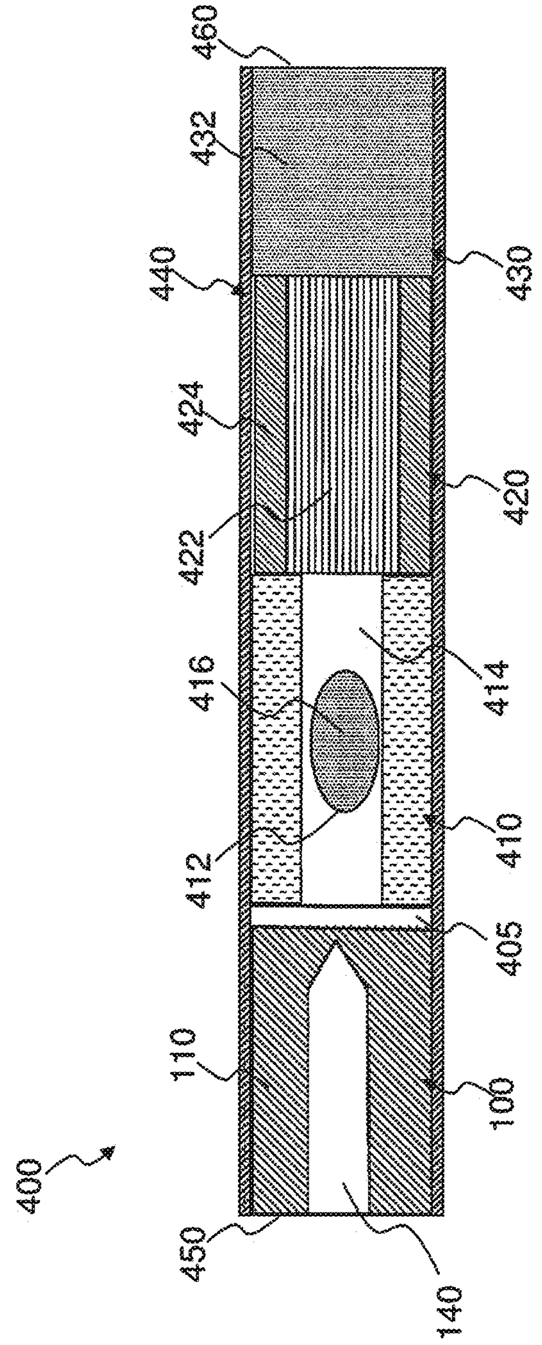
FIG. 4 shows a schematic longitudinal cross-section of an aerosol-generating article according to an example embodiment.

FIG. 4 shows an aerosol-generating article 400 according to an example embodiment. The aerosol-generating article 400 has a similar structure to the aerosol-generating article 200 of FIG. 2 and where the same features are present like reference numerals have been used. As with the aerosol-generating article 200 of FIG. 2, the aerosol-generating article 400 comprises liquid retention medium 410, an aerosol-cooling element 420, and a mouthpiece 430 arranged in coaxial alignment and circumscribed by a non-porous outer wrapper 440 to form a cylindrical rod. However, unlike the generating article 200 of FIG. 2, in the aerosol-generating article 400, the heat diffuser 100 is located at the upstream end 450 of the aerosol-generating article 400 and is also circumscribed by the outer wrapper 440, such that the heat diffuser 100 forms part of the aerosol-generating article 400. As shown in FIG. 4, a separation 405 is provided between the downstream end of the heat diffuser 100 and the upstream end of the liquid retention medium 410 to minimize the extent to which the liquid retention medium 410 might be heated by conduction from the heat diffuser 100.

As the heat diffuser 100 forms part of the aerosol-generating article 400, the heat diffuser 100 is removably coupled to the device as one with the rest of the aerosol-generating article 400, rather than as two separate components as is the case with the embodiments shown in FIGS. 1 to 3. Use of the aerosol-generating article 400 is otherwise the same as discussed above in relation to FIG. 3.

The example embodiments described above illustrate but do not limit example embodiments. It is to be understood that other example embodiments may be made and the example embodiments described herein are not exhaustive.

For example, although the examples shown in FIGS. 1 to 4 illustrate that the aerosol-articles 100 and 400 include one frangible capsule, in other examples, two or more frangible capsules may be provided. Alternatively, the articles may comprise a solid aerosol-forming substrate.

Furthermore, although the examples shown in FIGS. 1 to 4 illustrate the heating element as a heating blade arranged to extend into the heat diffuser, the heating element may be provided as one or more heating elements extending around the periphery of the cavity. Additionally or alternatively, the heating element may comprise a susceptor located within the heat diffuser. For example, a blade-shaped susceptor may be located within the heat diffuser, in contact with the porous body. One or both ends of the susceptor may be sharpened or pointed to facilitate insertion into the heat diffuser.

The invention claimed is:

1. An aerosol-generating article comprising:

a heat diffuser including a non-combustible porous body configured to absorb heat from an electric heating element, the porous body being thermally conductive such that air drawn through the porous body is heated by the heat absorbed by the porous body, the heat diffuser being located at a distal end of an aerosol-generating article, the distal end being upstream from an outlet end of the aerosol-generating article; a liquid aerosol-forming substrate; and a liquid retention medium entirely downstream of the heat diffuser and the electric heating element, the liquid retention medium configured to retain the liquid aerosol-forming substrate within the liquid retention medium, the heat diffuser being configured to heat the liquid aerosol-forming substrate in the liquid retention medium to form an aerosol.

2. The aerosol-generating article according to claim 1, wherein the heat diffuser and the liquid retention medium are spaced apart in a longitudinal direction of the aerosol-generating article.

3. The aerosol-generating article according to claim 2, wherein the heat diffuser and the liquid retention medium define a space between the heat diffuser and the liquid retention medium.

4. The aerosol-generating article according to claim 2, wherein the heat diffuser is removably coupled to the electric heating element.

5. An aerosol-generating system comprising:

an electrically operated aerosol-generating device, the electrically operated aerosol-generating device including, an electric heating element configured to generate heat, a heat diffuser including a non-combustible porous body configured to absorb the heat from the electric heating element, the porous body being thermally conductive such that, in use, air drawn through the porous body is heated by the heat absorbed by the porous body, the heat diffuser being located at a distal end of an aerosol-generating article, the distal end being upstream from an outlet end of the aerosol-generating article;

a liquid aerosol-forming substrate; and a liquid retention medium entirely downstream of the heat diffuser and the electric heating element, the liquid retention medium configured to retain the liquid aerosol-forming substrate within the liquid retention medium, the heat diffuser being configured to heat the liquid aerosol-forming substrate in the liquid retention medium to form an aerosol.

6. The aerosol-generating system according to claim 5, wherein the electrically operated aerosol-generating device includes the electric heating element and a housing having a cavity, the aerosol-generating article being received in the cavity such that the heat diffuser is penetrated by the electric heating element.

7. The aerosol-generating system according to claim 5, wherein the heat diffuser is removably coupled to the electric heating element.

8. The aerosol-generating system according to claim 5, wherein the porous body has a surface area-to-volume ratio of at least 20 to 1.

9. The aerosol-generating system according to claim 8, wherein the surface area-to-volume ratio is at least 100 to 1.

10. The aerosol-generating system according to claim 8, wherein the surface area-to-volume ratio is at least 500 to 1.

11. The aerosol-generating system according to claim 5, wherein the porous body includes a material having a thermal conductivity of at least 40 W/m·K at 23 degrees Celsius and a relative humidity of 50%.

12. The aerosol-generating system according to claim 11, wherein the porous body includes a material having a thermal conductivity of at least 100 W/m·K at 23 degrees Celsius and a relative humidity of 50%.

13. The aerosol-generating system according to claim 11, wherein the material includes a thermal conductivity of at least 150 W/m·K at 23 degrees Celsius and a relative humidity of 50%.

14. The aerosol-generating system according to claim 5, wherein the porous body includes a thermally conductive material selected from a group comprising of aluminium, copper, zinc, steel, silver, thermally conductive polymers, or any combination or alloy thereof.

15. The aerosol-generating system according to claim 5, wherein the porous body is configured to be penetrated by the electric heating element, the electric heating element forming a part of the aerosol-generating device.

16. The aerosol-generating system according to claim 15, wherein the porous body defines a cavity configured to receive the electric heating element when the heat diffuser is coupled to the aerosol-generating device.

17. The aerosol-generating system according to claim 16, wherein the porous body is rigid.

18. The aerosol-generating system according to claim 15, further comprising:

the electric heating element thermally coupled to the porous body.

19. The aerosol-generating system according to claim 18, wherein the electric heating element comprises a susceptor in the porous body.

20. The aerosol-generating system according to claim 5, further comprising:

a piercing member at one end of the porous body.

21. The aerosol-generating article according to claim 1, wherein the liquid retention medium defines a channel, a capsule including the liquid aerosol-forming substrate being within the channel of the liquid retention medium.

22. The aerosol-generating system according to claim 5, wherein the liquid retention medium defines a channel, a capsule including the liquid aerosol-forming substrate being within the channel of the liquid retention medium.

* * * * *